United States Patent [19]
Pitts, Jr.

[11] 3,842,265
[45] Oct. 15, 1974

[54] PULSED NEUTRON WELL LOGGING TECHNIQUES WITH BACKGROUND RADIATION REMOVAL

[75] Inventor: Robert W. Pitts, Jr., Houston, Tex.

[73] Assignee: Texaco Inc., New York, N.Y.

[22] Filed: May 21, 1973

[21] Appl. No.: 362,582

Related U.S. Application Data

[63] Continuation-in-part of Ser. No. 264,106, June 19, 1972, abandoned.

[52] U.S. Cl. ............................................. 250/270
[51] Int. Cl. ............................................. G01t 1/16
[58] Field of Search ............ 250/262, 264, 269, 270

[56] References Cited
UNITED STATES PATENTS
3,662,172  5/1972  Youmans ........................... 250/268

Primary Examiner—Archie R. Borchelt
Assistant Examiner—Davis L. Willis
Attorney, Agent, or Firm—T. H. Whaley; C. G. Ries

[57] ABSTRACT

An illustrative embodiment of the invention includes a system for pulsed neutron well logging. A pulsed source of 14 MEV neutrons repetitively irradiates earth formations surrounding a borehole. Two time gates, an inelastic neutron scattering gamma ray gate and a background gamma ray gate, pass signals from gamma ray detecting means to data processing circuitry during these selected time intervals. Four energy windows corresponding to carbon, oxygen, silicon and calcium inelastic gamma rays then pass the selected time count pulses falling in their respective energy ranges. During the background count time interval, background counts in each energy window are stored in memory means. During the inelastic gamma ray counting intervals the background counts are subtracted from the inelastic gamma ray counts to provide statistically enhanced counting data. These data may then be interpreted in terms of the properties of the earth formations and formation fluids in and about the borehole.

14 Claims, 3 Drawing Figures

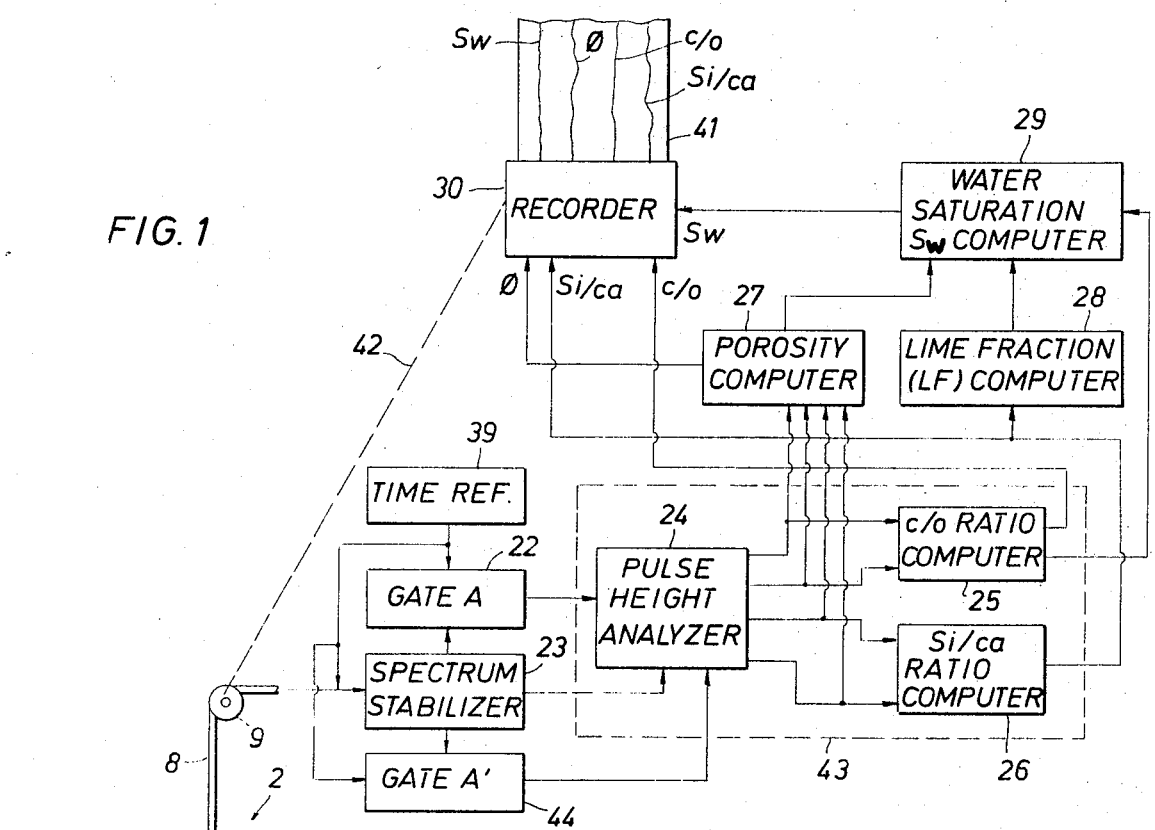
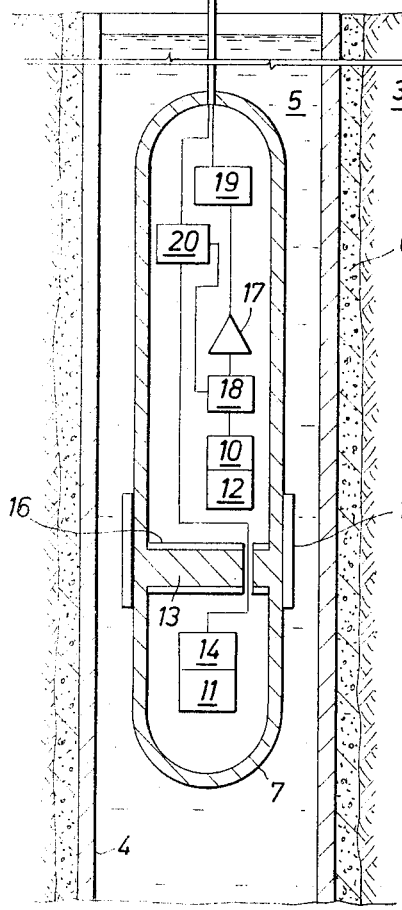
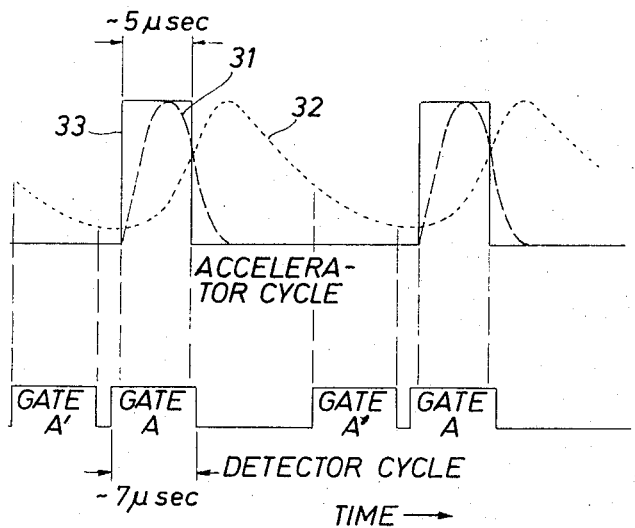
FIG. 1
FIG. 2

PULSED NEUTRON WELL LOGGING TECHNIQUES WITH BACKGROUND RADIATION REMOVAL

This application is a Continuation-in-Part of application Ser. No. 264,106 filed June 19, 1972, now abandoned.

BACKGROUND OF THE INVENTION

This invention relates to radiological well logging methods and apparatus for investigating the characteristics of subsurface earth formations traversed by a borehole and more particularly relates to improved neutron-gamma ray logging method and apparatus.

It is well known that oil and gas are more likely to be found in commercially recoverable quantities from those earth formations which are relatively porous and permeable than in more highly consolidated earth formations. It is also known that an oil and gas producing formation may be located by passing a neutron source through the borehole and measuring the intensity of secondary gamma radiation developing from the neutron irradiation as a function of borehole depth.

In particular, the chlorine nucleus which has a very high thermal neutron capture cross-section (more so than that of the nuclei of other rather commonly found elements) is a good indicator of the location of salt water. Thus, salt water filled limestone or sandstone layers in the earth will have a greater macroscopic thermal neutron capture cross-section than will oil saturated layers. When compined with other porosity information, oil can be detected by determining the chlorine content of a formation. This measurement has been observed in the past by measuring either chlorine capture gamma rays or the neutron lifetime or decay constant of the thermal neutron population in the earth layer being investigated.

The above mentioned salt water detection techniques have proven to be very useful in the past in locating oil and gas bearing earth formations. However, spurious indications have been produced by this logging technique due to the fact that it depends on the presence of a rather large amount of sodium chloride or other chlorine containing salts in the formation fluid. There has been no commercially available well logging method which can reliably distinguish oil from water in earth formations where the water salinity is low. For example, the above mentioned chlorine or neutron lifetime logging techniques usually require water salinities in excess of about 30,000 parts per million of sodium chloride or other chloride salts before oil which is situated in the pores of the formation being investigated can be differentiated from water located in these pores.

Accordingly, it has been proposed in the prior art to make a measurement of at least a portion of the gamma ray energy spectrum due to inelastic neutron scattering events from the neutron irradiated earth formations surrounding a well borehole. This has been proposed because carbon and oxygen has significant inelastic scattering cross-sections while having relatively small capture cross-sections. Thus, the carbon and oxygen nuclei in the earth formation surrounding the borehole can engage in appreciable inelastic scattering interactions with the bombarding neutrons. Gamma rays resulting from the inelastic neutron scattering interactions will be referred to henceforth as inelastic gamma rays. Thus, the inelastic gamma rays occurring at certain energies characteristic of inelastic scattering by carbon and oxygen nuclei may be used as an indicator of the relative amounts of these elements present in the earth formations surrounding the well borehole.

However, this approach has been limited in the past to some extent because the inelastic scattering cross-section for carbon and oxygen only become appreciable if relatively high energy neutrons are available to provide the inelastic scattering interaction events. In the past it has been difficult to provide a sufficient quantity of highly energetic neutrons to reliably perform this type of measurement as a well log. The development of improved borehole pulsed neutron generators, however, has made possible the measurement of the inelastic scattering gamma ray energy spectrum from relatively high energy neutron irradiated earth formations. Attempts have been made to measure the carbon and oxygen inelastic scattering interactions with 14 MEV neutrons generated in borehole sized pulsed neutron generators of the deuterium-tritium reaction type.

To the present, however, none of the proposed methods utilizing this concept have proven reliable. One of the main reasons for like of success in these attempts have been that carbon is present in significant amounts in the earth's crust. Moreover, limestone formations are largely composed of calcium carbonate. Thus, a water bearing limestone formation can produce more gamma rays due to inelastic scattering from carbon nuclei than an oil filled silicon sand or an oil saturated shale type formation. Moreover, the carbon/oxygen ratio of earth formations have been found to be a function of formation porosity. However, it has been found that the water saturation of earth formations may be accurately measured by use of the methods and apparatus to be described by determining the carbon/oxygen ratio.

Even if the improved pulsed neutron sources which are presently available are used to perform inelastic neutron scattering logs, the neutron output must be limited to a relatively small number of neutrons during each pulse of the pulsed neutron source so that pulse pile-up in the system electronics will not destroy the signal resolution of formation produced inelastic gamma rays. Pulse pile-up results from the fact that the system including the electronic circuits and the well logging cable only have the capability to effectively count pulse signals at a finite instantaneous counting rate. Also in this regard the neutron source to gamma ray detector spacing becomes particularly critical in regulating the count rate so as not to exceed the finite instantaneous count rate limitation of the system. Thus, in order to enhance the statistical accuracy of the inelastic scattering measurements (which generally are a function of the total number of counts) the source to detector spacing and pulse repetition rate of the pulsed neutron source can be varied to obtain optimum results. For this purpose the duration of each individual neutron pulse is made as short as possible (5 microseconds). Using these short pulses it is possible to obtain a source to detector spacing and pulse repetition rate which will provide a maximum number of total counts while not exceeding the instantaneous count rate limitation of the system during the inelastic gamma ray measuring intervals which coincide with the neutron pulse duration. Also, keeping the neutron pulse duration as short as possible reduces the count rate due to thermal neutron capture events. This desirable effect is produced because there is not a sufficient time duration for such thermal neutron background to build up significantly during such a short neutron pulse. However, increasing the pulse repetition rate too much to increase the total count can lead to the existence during the counting interval for inelastic gamma rays of a large thermal neutron population from a previous neutron pulse which still lingers in the vicinity of the well tool in the borehole. The present invention discloses means for effectively removing the effects of any large thermal neutron background from the counting statistics of a carbon/oxygen logging system for determining the location of oil in relatively fresh water filled earth formations.

It would be appreciated by those skilled in the art that the foregoing discussion of the parameters which may be varied to optimize the logging speed and counting statistics of an inelastic neutron scattering log are interdependent, not only with each other but also with the physical parameters of the well bore being examined. For example, the borehole diameter, relative thickness of casing and cement sheath, and type of borehole fluid can all affect the inelastic gamma ray counting rate. Thus, in order to obtain reasonable counting rates at reasonable source to detector spacings and still maintain resolvable gamma ray pulses which are not seriously deteriorated by the pulse pile-up phenomena it is desirable to repeat the neutron pulses at a high rate.

Accordingly, it is an object of the present invention to provide improved apparatus for obtaining information indicating the presence of oil bearing formations in relatively low salinity earth structures utilizing inelastic neutron scattering measurements.

A further object of the invention is to provide new and improved methods and apparatus for determining the carbon/oxygen ratio in earth formations surrounding a well borehole by use of rapidly repetitive neutron pulses and inelastic neutron scattering measurements.

A still further object of the invention is to provide a well logging system which directly indicates the presence of oil in earth formations surrounding a well borehole independently of the presence of thermal neutron background gamma radiation in these formations.

The above other objects, features and advantages of the present invention are provided in a pulsed neutron well logging system. The system utilizes four energy dependent windows or intervals in the gamma ray energy spectrum. Two time dependent gating means isolate gamma rays resulting from inelastic scattering of neutrons by earth formations surrounding the well borehole and from thermal neutron background gamma radiation resulting from previous neutron pulses which may still linger in the vicinity of the well logging tool. The four energy windows in the inelastic gamma ray energy spectrum are positioned and their width chosen so that inelastic gamma rays from carbon, oxygen, silicon and calcium are detected. Gamma rays occurring in the carbon and oxygen windows or any combination of the windows may be utilized as an indicator of formation porosity. The carbon/oxygen ratio detected by the present invention can be indicative of the presence of hydrocarbons in the pore space of the surrounding earth formations and the silicon/calcium ratio can be indicative of the formation lithology.

Circuit means are provided for subtracting the effects of thermal neutron background radiation from the inelastic gamma radiation measurements made during the inelastic gamma ray counting intervals. This technique provides statistically enhanced measurements of the carbon/oxygen and silicon/calcium ratios in the earth formations surrounding the well borehole. Direct digital readout, megnetic tape recording output in digital form or analog form or chart recorded output of the various ratios contemplated for the measurements of the invention are also provided.

The above and other objects, features and advantages of the invention are pointed out with particularly in the appended claims. The invention is best understood by taking the following detailed description thereof in conjunction with the appended drawings in which:

BRIEF DESCRIPTION OF THE DRAWINGS

FIG. 1 is an overall schematic block diagram of a well logging system in accordance with the invention.

FIG. 2 is a timing diagram showing the relationship of accelerator and detector "on" time with respect to the gamma rays caused by the inelastic scattered neutrons and thermal neutron background in the vicinity of the borehole.

DESCRIPTION OF THE PREFERRED EMBODIMENTS

Figure 3:
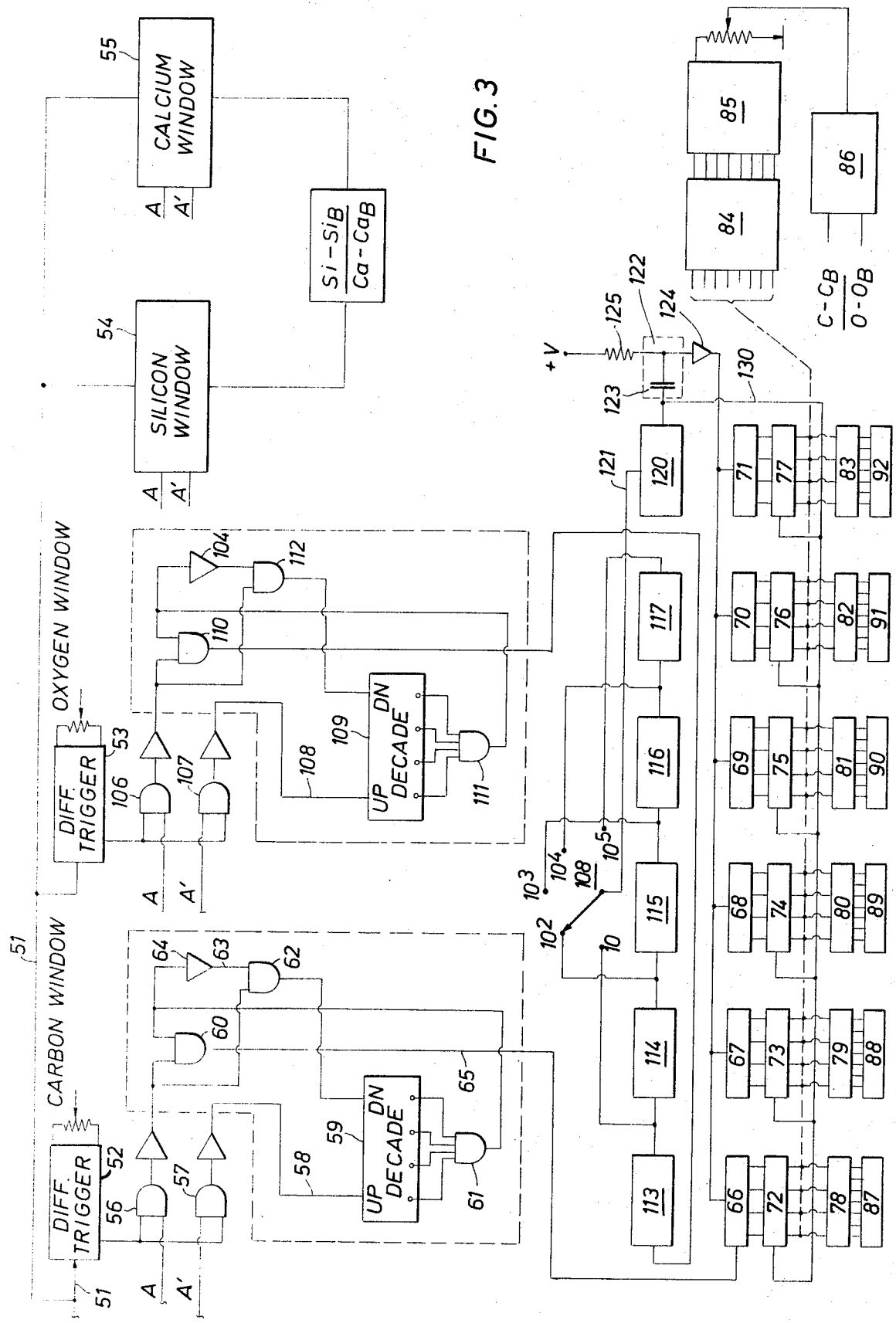
FIG. 3 is a more detailed but still schematic circuit diagram of a portion of the circuitry shown in schematic form in FIG. 1 for performing the background subtraction and ratio measurements of the invention.

Referring initially to FIG. 1 there may be seen a simplified functional representation in the form of a block diagram of well logging apparatus in accordance with the invention. A borehole 2 penetrating earth formations 3 in lined with a steel casing 4 and filled with a well fluid 5. The steel casing 4 is cemented in place by a cement layer 6 which also serves to prevent fluid communication between adjacent producing formations in the earth 3.

The downhole portion of the logging system may be seen to be basically composed of an elongated fluid tight body member on sonde 7 which during the logging operation is passed longitudinally through the casing 4 and is sized for passage therethrough. Surface instrumentation, whose function will be discussed in more detailed subsequently, is shown for processing and recording electrical measurements provided by the sonde 7. A well logging cable 8 which passes over a sheave wheel 9 supports the sonde 7 in the borehole and also provides a communication path for electrical signals to and from the surface equipment and the sonde 7. The cable 8 may be of a conventional armored well logging type and may have one or more electrical conductors for transmitting such signals between the sonde 7 and the surface apparatus. It is, however, preferable in the present invention for the well logging cable to be of the triaxial (or armored coaxial) cable of the type shown and described in copending patent application entitled "Well Logging System and Method Using An Armored Coaxial Cable and Compensation Circuit", Ser. No. 192,883 filed Oct. 27, 1971 and which is assigned to the assignee of the present invention. Such a triaxial cable has desirable bandwidth capabilities for enhacning the measurement and preserving the shape of pulses generated in the downhole equipments.

Again referring to FIG. 1, the sonde 7 contains a source of high energy neutrons 11. The neutron source contemplated for use herein is a pulsed neutron source operating from the principle of the deuterium-tritium reaction. However, it will be understood by those skilled in the art that the invention is not limited thereto. Other types of pulsed neutron sources may be used if desired. A suitable radiation detector comprising a photomultiplier tube 10 and a detector crystal 12 is provided in the sonde 7 for detecting gamma rays resulting from the inelastic scattering of high energy neutrons by the earth formations 3 surrounding the well borehole 2. A radiation shield 13 of iron, lead or other suitable material is interposed between the neutron accelerator 11 and the detector crystal 12 of the apparatus. Additionally, a thermal neutron shielding sleeve 15 may be provided as shown about the detector crystal 12 on either the interior or the exterior wall portion of the sonde. A thermal neutron shielding disk 16 is interposed between the radiation shielding material 13 and the detector crystal 12 to reduce the probability of thermal neutrons reaching the detector crystal. This thermal neutron shielding material may comprise a boron sleeve or a sleeve of any other suitable material having a high thermal neutron capture cross-section. The detector crystal 12 may comprise a thallium doped, sodium iodide or cesium iodide or other like activated material which is optically coupled to the photomultiplier tube 10.

The radiation shield 13 reduces the probability of direct irradiation of the detector crystal by neutrons emitted from the pulsed neutron source or accelerator 11. The thermal neutron shield serves to reduce the possibility of thermal neutrons which follow a tortuous path and have been slowed to thermal energies by the borehole fluid 5 or shielding material 13 from reaching the vicinity of the detector crystal and possibly causing neutron activation of the iodine or other elements comprising the crystal. Moreover, the thermal neutron shield reduces the probability of thermal neutrons from a previous accelerator neutron pulse interacting with the materials with the sonde itself or the detector crystal itself and causing the emission of gamma radiation during the time period when the inelastic neutron gamma rays are being observed. However, as will be discussed subsequently, the thermal neutron background radiation which is still present during the inelastic gamma ray counting period is accounted for in the manner to be described.

As is well known in the art, the scintillation crystal 12 produces a discreet flash of light whenever a gamma ray passes therethrough and exchanges energy with the crystal and lattice work of the crystal. The photomultiplier tube 10 generates a voltage pulse proportional in height to the intensity of each such scintillation which occurs in the crystal 12. The intensity of such scintillations is functionally related to the energy of the gamma ray causing the light flash. Thus, a voltage pulse generated by the photomultiplier tube 10 has an amplitude functionally related to the energy of the corresponding gamma ray. These proportional voltage pulses produce by the photomultiplier tube 10 then comprise a detector signal which is supplied to a linear amplifier 17 via a discriminator 18, if desired. The discriminator 18 may be used to discriminate for example against low energy background gamma radiation resulting from thermal activation of the detector crystal by the reaction $I^{127}$ (N, $\gamma$) $I^{128}$. A preset bias level may be used to pass only pulses from the photomultiplier tube 10 exceeding the height corresponding to 1.78 MEV gamma rays generated in the inelastic of neutrons by silicon. Low energy background gammas which would otherwise contribute to pulse pile-up could be eliminated in this manner. Also, locating the discriminator 18 downhole reduces the counting rates supplied to the cable, thus enhancing the possibility of avoiding pulse pile-up. The discriminator 18, however, is optional in the system and may be deleted if so desired.

The neutron accelerator 11 is preferably operated by a pulsing circuit 14 which may be of conventional design as known in the art. The pulsing circuit 14 functions to operate the accelerator 11 in short duration pulses. Pulsing circuit 14 may be controlled by timing pulses from a surface timing reference or oscillator 39 which are communicated over the cable 8 and which may also be supplied to a downhole reference pulser 20. For example, the pulsing circuit 14 could be activated by a timing pulse from time reference 39 to emit a neutron burst of a specified time duration. The frequency of such bursts could then be controlled by the surface timing reference 39. It will be understood, of course, that timing reference 39 could alternatively be located in the downhole sonde if desired. In this event circuits can be provided at the surface for detecting the timing pulses and using them to control the time gates to be described. In the inelastic scattering measurements contemplated in the present invention it is desirable to use neutron pulses of about 5 microseconds duration and which are repeated at intervals from approximately 5,000 to 20,000 or more times per second.

Referring now to FIG. 2, the relative time relationship of the neutron burst or pulses just discussed to the operative gamma ray detector cycle and to the inelastic and thermal neutron populations are shown. The accelerator cycle in FIG. 2 is represented by the solid for measuring 33. The inelastic gamma ray population in the vicinity in the detector crystal 12 is represented by the dashed curve 31. The thermal neutron capture gamma ray population in the vicinity of the detector is shown by the dotted line curve 32. The operative detector cycle is represented by the separate solid line curve 34 located beneath the curves 31, 32 and 33 just described. It will be noted that just prior to each of the approximately 5 microsecond duration neutron pulses of curve 33 that the detector is activated for a time labeled gate A' formeasuring any lingering thermal neutron decay population existent in the vicinity of the detector. Then, just prior (about 1 microsecond) to the beginning of the accelerator cycle, the gate A is opened for making counts of gamma rays due to the inelastic neutron scattering events. This timing sequence is accomplished by supplying timing pulses from time reference 39 to signal gates 22 and 44 to accomplish the respective time sequence illustrated in FIG. 2 while also supplying the timing pulses via cables 8 to the downhole pulser 14 for operating the accelerator.

There is a sudden and rapid buildup of the inelastic gamma ray population (curve 31) which is essentially present only during the neutron pulse. The thermal neutron capture gamma ray population (curve 32) builds up much slower and reaches a peak only after the cessation of the 5 microsecond neutron pulse. However, some portion of the thermal neutron population is still present from succeeding pulses of neutrons and it is a function of the background count taken in gate A' time interval that is used in the present invention for correcting the inelastic gamma ray counts for this thermal neutron activation gamma ray background. In the diagram of FIG. 2 it should be noted that the neutron pulses are spaced sufficiently far apart in time for most of the thermal neutron population (curve 32) to decay before the next pulse. Furthermore, the boron thermal neutron shielding material 15 and disk 16 further reduces spurious gamma ray detections resulting from thermal neutrons in the vicinity of the detector in the borehole.

Referring again to FIG. 1 and bearing in mind the timing sequence illustrated in FIG. 2 it will be observed that during the time the neutron accelerator 11 is activated output signals from the photomultiplier tube 10 are conducted via the discriminator 18 and linear amplifier 17 to a cable driver circuit 19 which may be of conventional design. A reference signal having a known amplitude is also supplied by a pulser 20 to the input of the discriminator 18. The reference pulses provided by downhold pulser 20 are utilized in a gain control circuit or spectrum stabilizer 23 at the surface to control the gain of the system in the manner described in the aforementioned copending patent application.

Since both the downhole pulse generator 14 and the surface gating means 22 and 44 which control data pulses from the downhole tool are timed by the same timing reference 39 it is apparent that synchronism may be maintained between the surface equipment and the downhole equipment. Thus, the data signals may be gated in a manner at the surface to select the portions thereof for processing which are timed as desired relative to the emission of the neutrons in the manner previously discussed with respect to FIG. 2.

Although not depicted in FIG. 1, it will be understood by those skilled in the art that electrical power may be supplied from a surface power source (not shown) via the well logging cable 8 to the downhole sonde 7. Suitable power supplies (not shown) are provided in the sonde for powering the downhole portion of the equipment.

The output signals supplied on cable 8 by the downhole equipment comprise a sequence of count pulses resulting from the gamma rays detected by the downhole detector crystal 12 during the time interval of gate A' (just prior to the neutron pulse) and during a time interval corresponding to the open time of gate A. During the gate A open time the signals comprise a combination of background plus inelastic gamma ray scattering, the background being primarily due to the thermal neutron gamma rays previously discussed. An accurate estimate of these background gamma rays is provided by the gamma ray count occurring in gate A' (which is of the same duration as gate A) but which occurs just prior to the beginning of the neutron pulse. The gamma ray pulses occurring in both time gates A and A' are supplied to circuitry illustrated generally in the dotted box 43 which comprises, functionally, a pulse height analyzing circuit 24, a carbon/oxygen ratio computer 25 and a silicon/calcium ratio computer 26. Output signals from the pulse height analyzer 24, the carbon/oxygen ratio computer 25 and the silicon/calcium ratio computer 26 are supplied to further data processing circuits shown schematically as a porosity computer 27, a lime fraction computer 28 and a water saturation computer 29.

Additionally, the outputs from the porosity computer 27, lime fraction computer 28 and water saturation computer 29 together with the carbon/oxygen ratio and silicon/calcium ratio quantities are supplied to a recorder 30 which plots or logs a record of the various quantities as a function of borehole depth. The record medium 41 of the recorder is driven as a function of borehole depth by electrical or mechanical linkage indicated by a dotted line 42 from the sheave wheel 9 as the sonde 7 is moved vertically through the borehole. This technique for depth logging is well known in the art.

The settings for the energy windows for the carbon, oxygen, silicon and calcium inelastic gamma ray detection is described in a second copending application entitled "Improved Pulsed Neutron Logging System" filed Sept. 20, 1971 and having Ser. No. 182,035, which is assigned to the assignee of the present invention. The functioning of the porosity computer 27, lime fraction computer 28 and water saturation computer 29 of FIG. 1 is described in detail in this copending application and hence will not be referred to further in the present application as it does not pertain to the present invention.

Referring now to FIG. 3, circuitry for performing the functions generally indicated in the box 43 of FIG. 1 is shown in more detail. The circuitry of FIG. 3 is best understood by recalling the timing diagrams of FIG. 2 in conjunction therewith. The gamma ray count pulses supplied via cable 8 from the downhole sonde 7 are provided to the energy windows of the pulse height analyzer portion of the apparatus via a line 51 and appear thereon as negative polarity pulses. The windows for each energy range of interest are supplied by differential triggers 52, 53, 54 and 55. For example, differential trigger 52 corresponds to the energy window chosen for the carbon inelastic gamma rays. Differential trigger 53 corresponds to the energy window for oxygen gamma rays. Differential trigger 54 corresponds to the energy window for silicon gamma rays and differential trigger 55 corresponds to the energy window for the calcium inelastic gamma rays. The differential triggers 52–55 furnish output pulses only if the input voltage pulse supplied to them falls between two preselected voltage levels corresponding to the energy range or band of energies for which that window is set. Thus, if an oxygen inelastic gamma ray pulse appears at the input to differential trigger 52, no output pulse will result. However, an output pulse will result at the output of the differential trigger 53 when the same oxygen inelastic gamma ray input pulse is supplied thereto. In this manner only those gamma rays corresponding to the energy band regions of interest in the gamma ray energy spectrum for each of the four elements are permitted to pass through the energy windows. This is the pulse height analysis function of the circuitry.

For purposes of discussion with regard to FIG. 3 we will consider only those input pulses supplied to the differential triggers 52 and 53 from the downhole portion of the system. It will be understood that the functioning of the circuits with respect to the silicon and calcium energy windows corresponding to differential triggers 54 and 55 are operated or in an analogous manner.

Consider now the signals input to the differential trigger corresponding to the carbon energy window 52. In addition to the gamma ray voltage pulse input signals permitted to pass through the differential trigger energy window 52, voltage gating pulse signals from time gate A (i.e., gate 22 of FIG. 1) and gate A' (i.e., gate 44 of FIG. 1) are supplied to gates 56 and 57. The time signal from gate A is applied to one input terminal of gate 56 and the timing signal from gate A' is supplied to one input terminal of gate 57. Thus, the output of gate 56 comprises negative polarity pulses which fall within the carbon energy window only during the inelastic gamma ray counting portion (gate A) of the operating cycle. Similarly, output signals from gate 57 correspond to background gamma rays (due to the capture of lingering thermal neutrons as described) which fall within the carbon energy wwndow during the background gating period A' previously discussed. The background signals occurring within the carbon energy window are supplied via line 58 to the up count input of an up-down decade counter 59 which is utilized as a memory device. The output signals from gate 56 are supplied to one input of a gate 60 which serves as a data blocking gate. The opposite input of data blocking gate 60 is conditioned by the output of a four input AND gate 61 which operates as a zero recognition circuit on the terminals of the four bit up-down decade 59. Additionally, the output signals from gate 56 are supplied to one input terminal of a count down gate 62. The opposite terminal of the count down gate 62 is conditioned from the output of the zero recognition gate 61 via line 63. Inverter 64 establishes correct pulse polarity for this purpose. The output of the data blocking gate 60 is supplied via line 65 to the input terminal of cascaded decade counters 66, 67, 68, 69, 70 and 71. The decade counters 66-71 represent a counting register which counts in decades (tens) and supplies output signals via quad latches 72, 73, 74, 75, 76 and 77 to appropriate seven segment decoders 78, 79, 80, 81, 82 and 83. The output of quad latches 72–77 is also supplied via a bit slide switch 84 to a digital to analog converter 85 if desired. An operational amplifier 86 then supplies the amplified analog signal from the D to A converter 85 to a recorder such as recorder 30 of FIG. 1 or to other digital or analog circuitry as desired (i.e., such as the additional processing circuits of FIG. 1). For example, the putputs of the seven segment decoders 78–83 may be supplied to light emitting diode (LED) digital display devices 87, 88, 89, 90 and 91 and 92 for visual display if desired.

Similarly, gamma ray voltage pulse signals from the downhole sonde 8 are supplied via line 51 to the differential trigger energy window 53 (corresponding to the oxygen energy range) and output signals from the differential trigger energy window are supplied to one input of gates 106 and 107. Gates 106 and 107 are similarly supplied with time gate conditioning signals from time gates A and A' in a manner analogous to the conditioning of gates 56 and 57 discussed previously. Thus, output signals from gate 106 are developed only when a gamma ray pulse appears on input line 51 which falls within the oxygen energy window during the open time of gate A for inelastic gamma ray detection. Also, background gamma ray counts appear at the output of gate 107 only during the gate open time interval of the background count corresponding to time gate A'. The background counts output from gate 107 are supplied to the "up count" input of a decade counter 109 on a line 108. Output signals from gate 106 are supplied to one input of a data blocking gate 110 and simultaneously to one input of a count down gate 112. The output of a "zero recognition" four input AND gate 111 (which is connected to the four bit outputs of the decade 109) is supplied to the opposite input of the gate 112 for conditioning purposes of this count down gate. The output from the count down gate 112 is supplied to the "down count" input terminal of decade 109. Similarly, the output of zero recognition circuit 111 is supplied to the second input of the data blocking gate 110 in a manner analogous to that zero recognition signal supplied to data blocking gate 60 with respect to the carbon energy window. However, output signals from data blocking gate 110 are supplied to a plurality of serially switchable divide by 10 decades 113, 114, 115, 116 and 117 which are connected in series and which may be switched in or out of the circuit via a manual switch 118. The outputs of the decades 113–117 are sampled via the wiper arm of the switch 118 and used to trigger a one shot 120 via line 121 from the switch 118 wiper arm. Output signals from the one shot 120 are supplied via a differentiator circuit 122 comprising, generally, a capacitor 123, an inverter 124 and a resistor 125 to the reset input terminal of decades 66–71. The leading edge of the square wave pulse produced by one shot 120 is supplied via line 130 and shifts the number contained in the decades 66–71 into the quad latch circuits 72–77 just prior to resetting the decades 66–71 to begin a new counting interval. The differentiator circuit 122 functions to differentiate the square wave output of one shot 120 to provide the just mentioned shifting pulses and also reset pulses on the trailing edge thereof for resetting the decades 66–71.

The beginning of an operating cycle of the apparatus may be thought of as commencing with the opening of time gate A' (corresponding to the gate 44 of FIG. 1). When this occurs a conditioning pulse appears at one input terminal of gate 57 from the timing gate A' of FIG. 1. Simultaneously signals appear from the downhole tool on input line 51. The time gate A' conditioning signal also appears at the input terminal of gate 107 at this time (as well as at corresponding gates (not shown) in the silicon 54 and calcium 55 energy window circuits). Pulse signals from the downhole tool which fall within the energy windows set on differential trigger 52 (carbon) and differential trigger 53 (oxygen) pass therethrough and appear at the opposite input terminals of gates 57 and 107 respectively. These signals comprise count pulse signals primarily representative of the thermal neutron capture gamma rays which have been degraded by compton scattering and which fall within the energy window set on the differential triggers 52 and 53. In the case of a gamma ray pulse falling within the energy window of differential trigger 52, an output is produced on line 58 and enters the "up count" input terminal of the decade 59. Similarly, background counts passing through the energy window of differential trigger 53 appear as output pulses from gate 107 on line 108 at the "up count" terminal of decade 109. Thus, for the length of time that time gate A' conditioning signals appear at the conditioning terminals of gates 57 and 107 background radiation counts due to thermal neutron gamma rays appearing within the respective energy windows is counted into the "up" terminals of decades 59 and 109 which can contain up to 10 such background counts and act as a memory therefor. This capacity is very adequate for the relatively short duration of the operating cycle of the time gates A and A'. When the gate A' conditioning signal ceases to appear at the conditioning terminals of gates 57 and 107, decades 59 and 109 contain the number of background counts which occurred during the background gating interval (gate A'). The interval of gate A' or the background gate is preferably approximately the same time duration as the gating interval of gate A for the inelastic gamma rays. Thus, the number of counts occurring during this interval is representative of the number of background counts occurring during the inelastic gamma ray counting interval also, since the two gates occur so near together in time.

When the background counting interval is complete the inelastic gamma ray counting interval begins. Conditioning signals for this are supplied from time gate A of FIG. 1 to gates 56 and 106. The neutron generator is started in the downhole tool to provide high energy neutrons for inelastic gammay ray measurements. The signals from the inelastically scattered gamma rays begin appearing on line 51 and are permitted to pass through gates 56 and 106 provided they can fall within the energy windows of differential triggers 52 and 53. During the background counting interval A', the data blocking gates 60 and 110 are not conditioned. Therefore, the inelastic gamma ray pulses appearing at the outputs of gates 56 and 106 are routed to the "count down" terminals of decades 59 and 109 respectively via count down gates 62 and 112. Gates 62 and 112 are conditioned for this purpose via inverters 64 and 104 respectively from the output of the zero recognition circuits 61 and 111. Thus, the first few inelastic scattering gamma ray pulses which enter the energy windows during the inelastic gamma ray counting interval of gate A are used to count decades 59 and 109 down. This continues until a zero condition is sensed by the zero recognition AND gates 61 and 111. At this time the zero recognition gates 61 and 111 change state and the count down gates 62 and 112 are conditioned to no longer pass data pulses. The decades 59 and 109 are at this time restored to their zero count conditions and the flow of data from the output of gates 56 and 106 are now routed via data blocking gates 60 and 110 to the counting decades 66-71 (in the case of the carbon window) and to the divide by 10 decades 113-117 (from the oxygen window). This has the effect of subtracting the background radiation from the inelastic gamma ray data since the background count in each energy window which was accumulated during the gate A' interval must be counted down from the memory decades 59 and 109 before any data can flow into counting decades 66-71 and dividing decades 113-117.

When all background gamma ray pulses are effectively subtracted in this manner then carbon inelastic gamma rays begin being counted in decades 66-71. Oxygen inelastic gamma rays are routed into the divide by 10 decade series 113-117 of which either 10, 100, 1000, $10^4$ or $10^5$ divisors are manually selected by positioning the wiper arm of the manual switch 118. Thus, a count is accumulated in counting decades 66-71 for the carbon inelastic gamma rays until such a time as a manually selected number of oxygen inelastic gamma rays (corresponding to 10, 100, $10^3$, etc.) have occurred. When the selected number of oxygen gamma rays have occurred, the appropriately selected divide by 10 decade (for example, the 100 decade as shown in the drawing of FIG. 3) provides an output pulse via wiper arm of switch 118 on line 121 to the one shot 120. Upon receipt of the output pulse from the appropriate divide by 10 decade on line 121, one shot 120 produces a square wave output pulse which is routed via line 130 and differentiator circuit 122 to transfer the data from counting decades 66-71 and to set quad latches 72-77 to hold their count for the visual display. As previously discussed, just prior to the reset pulse the number of counts occurring in the carbon energy window is stored in the quad latches 72-77 for visual or chart display. The digital readout via the seven segment decoders 78-83 is provided on LED digital display devices 87-92 with the decimal point being correctly positioned on the display by the manual selector switch 118 on another wafer (not shown).

The bit slide switch 84 samples the outputs of quad latches 72-77 and provides them to digital to analog converter 85 where they are converted into an analog voltage representative of the quantity of carbon inelastic gamma rays minus background gammas in the carbon window over oxygen inelastic gamma rays minus background gammas in the oxygen window ($C-C_B/O-O_B$). This analog signal is then presented to operational amplifier 86 which may be used as a chart recorder driver or for any other analog display device as desired. The output from the bit slide switch may also be supplied to other digital devices such as digital tape recording devices (not shown).

In a similar manner, pulses which appear in the silicon and calcium energy windows 54 and 55 are processed to compute the silicon window inelastic minus silicon window background ($Si-Si_B$) and calcium window inelastic minus calcium window background ($Ca-Ca_B$) signals and the ratios thereof in the manner exactly analogous to the previous description of the processing for the carbon and oxygen windows.

The above description may make other alternative embodiments of the invention apparent to those skilled in the art. It is therefore the aim in the appended claims to cover all such changes and modifications as fall within the true spirit and scope of the invention.

I claim:

1. A method for correcting inelastic gamma ray measurements of earth formations in the vicinity of a well borehole for background gamma rays caused by other than inelastic neutron scattering events comprising the steps of:

repetitively irradiating the earth formations surrounding the well bore with relatively short duration pulses of fast neutrons;

detecting, just prior to each such pulse of fast neutrons, the background gamma radiation in the borehole and storing counts representative thereof in counter memory means;

detecting, during each such pulse of fast neutrons, gamma radiations due to the inelastic scattering of neutrons by materials comprising the earth formations in the vicinity of the borehole together with background gamma radiations and making counts representative thereof; and subtracting said stored background counts from said inelastic plus background counts and storing the resultant corrected counts in memory register.

2. The method of claim 1 wherein, just prior to each neutron pulse, said background gamma radiation counts are stored in said counter memory means by applying data pulses representative of said background gamma radiation to the "up count" input terminal of each counter over a predetermined time interval, hence summing said background pulses as a background count in said counter.

3. The method of claim 2 wherein said subtracting step is performed by routing data pulses of gamma radiation made during each neutron pulse to the "down count" input terminal of such counter until said counter reaches a zero count content and then rerouting said data pulses of gamma radiation made during each neutron pulse to a summing register whereby a cumulative total of corrected counts is stored.

4. The method of claim 3 wherein the counting interval for background radiation just prior to each neutron pulse and the counting interval for inelastic together with background radiation during each neutron pulse are of approximately the same time duration.

5. The method of claim 1 wherein said steps are performed for gamma ray pulses corresponding to at least two different energy regions of the gamma ray energy spectrum.

6. The method of claim 5 wherein the ratio of the corrected counts in the memory register means of the first of said two energy regions and the second of said energy regions is performed and an output ratio signal representative thereof generated when the counts in the memory register means corresponding to said second energy region reaches a predetermined value.

7. The method of claim 6 wherein said predetermined value is some power of 10.

8. Apparatus for correcting inelastic gamma ray measurements of earth formations in the vicinity of a well borehole for background gamma rays caused by other than neutron scattering events comprising:
means for repetitively irradiation the earth formations surrounding the well bore with relatively short duration pulses of fast neutrons;
means for detecting gamma radiations in the well bore and for generating electrical data signal pulses representative thereof;
first gating means operative for a short duration beginning and ending just prior to each neutron pulse for routing said data pulses to the up count input terminal of a counter means;
second gating means operative for a short duration during each of said neutron pulses for routing said data signal pulses to the down count input terminal of said counter means and to one input terminal of a data blocking gate;
means for detecting a zero content condition of said counter means for generating a conditioning signal to a second input terminal of said data blocking gate upon the occurrence thereof, to permit passage of said data pulses therethrough;
summing register means for accumulating a count of data pulses passed through said data blocking gate, said pulses being representative of a background corrected inelastic gamma ray event occurrence.

9. The apparatus of claim 8 and further including energy gating means for allowing only data pulses falling within a preselected energy range in the gamma ray energy spectrum to be input to said first and second gating means.

10. Apparatus as in claim 8 and further comprising plural energy gating means and plural background subtraction circuit means as described together with means for forming a ratio of background corrected counts from selected pairs of said summing register means upon the occurrence of a predetermined number of counts in one of said selected pair of summing register means.

11. A method for correcting inelastic gamma ray measurements in earth formations in the vicinity of a well borehole for background gamma rays caused by other than inelastic neutron scattering events comprising the steps of:
repetitively irradiating the earth formations surrounding a well borehole with relatively short duration pulses of fast neutrons;
detecting, during other than the irradiation interval, the background gamma radiation in the borehole and storing counts representative thereof in memory means;
detecting, during said neutron pulses, gamma radiations due to the inelastic scattering of neutrons by materials in the vicinity of the borehole together with background gamma radiations and making counts representative thereof; and
correcting said inelastic together with background counts for background by removing a function of said stored counts representative of the background radiation therefrom and storing the resultant corrected counts.

12. The method of claim 11 wherein said correcting step is performed by subtracting all of said stored background counts from said inelastic together with background counts.

13. The method of claim 11 wherein the step of detecting the background radiation and storing counts representative thereof is performed repetitively during a time interval, just prior to each neutron pulse and of approximately the same duration as the neutron pulses, and each such background detection interval ends prior to the beginning of the succeeding neutron pulse.

14. The method of claim 11 wherein said steps are performed for gamma ray pulses of background gamma radiation and inelastic together with background gamma radiation in a plurality of energy regions in the gamma ray spectrum in parallel modes of operation for each such energy region.

* * * * *